United States Patent
Jain et al.

(10) Patent No.: US 7,386,309 B1
(45) Date of Patent: Jun. 10, 2008

(54) METHOD AND SYSTEM FOR DISTRIBUTED WIRELESS ACCESS

(75) Inventors: Vipin Jain, Sant Clara, CA (US); Steven Russell, Atherton, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1052 days.

(21) Appl. No.: 10/289,609

(22) Filed: Nov. 6, 2002

Related U.S. Application Data

(60) Provisional application No. 60/384,463, filed on May 31, 2002.

(51) Int. Cl.
*H04Q 7/20* (2006.01)

(52) U.S. Cl. .............. 455/426.2; 455/554.1; 455/554.2

(58) Field of Classification Search .......... 455/403, 455/422.1, 426.2, 432.2, 446, 449, 554.1, 455/555, 554.2, 101, 562.1; 375/209, 220, 375/222, 316, 346, 347; 370/334, 329, 310, 370/328
See application file for complete search history.

(56) References Cited

U.S. PATENT DOCUMENTS

| | | | | |
|---|---|---|---|---|
| 5,657,374 A | * | 8/1997 | Russell et al. .......... 370/328 |
| 5,890,055 A | * | 3/1999 | Chu et al. .............. 455/16 |
| 5,983,070 A | * | 11/1999 | Georges et al. .......... 725/78 |
| 6,252,548 B1 | * | 6/2001 | Jeon ..................... 342/383 |
| 6,484,030 B1 | * | 11/2002 | Antoine et al. .......... 455/444 |
| 6,549,772 B1 | * | 4/2003 | Chavez et al. .......... 455/422.1 |
| 6,628,931 B1 | * | 9/2003 | Tomida ................. 455/193.1 |
| 6,704,545 B1 | * | 3/2004 | Wala .................... 455/16 |
| 6,745,003 B1 | * | 6/2004 | Maca et al. ............. 455/11.1 |
| 6,771,958 B1 | * | 8/2004 | Koo et al. .............. 455/426.1 |
| 6,788,948 B2 | * | 9/2004 | Lindskog et al. ........ 455/504 |
| 2002/0065058 A1 | * | 5/2002 | Gatherer et al. ......... 455/272 |
| 2002/0077742 A1 | * | 6/2002 | Mintz ................... 701/117 |

* cited by examiner

*Primary Examiner*—Jean Gelin
(74) *Attorney, Agent, or Firm*—Blakely Sokoloff Taylor & Zafman LLP

(57) ABSTRACT

A method and system is provided for distributed wireless access. The system includes an access concentrator and a plurality of antenna modules. The antenna modules are spread across a campus and are coupled to the access concentrator via network wiring. Each antenna module includes an antenna to receive and transmit signals. When incoming signals are received at the antenna, the signals are converted from a radio frequency to a lower frequency. The converted signals are then digitized. The digital signals are then processed by digital signal processing resources at the access concentrator. Then, the processed signals are forwarded out of the corresponding ports to a LAN switch.

19 Claims, 3 Drawing Sheets

METHOD AND SYSTEM FOR DISTRIBUTED WIRELESS ACCESS

1. PRIORITY

This application claims the benefit of U.S. Provisional Application No. 60/384,463, filed May 31, 2002, entitled "Distributed 802.11 System."

BACKGROUND

1. Technical Field

Embodiments of the invention relate to the field of telephone electronics, and more specifically to a distributed wireless access system.

2. Background Information and Description of Related Art 802.11 is a family of specifications for wireless local area networks (WLANs) developed by a working group of the Institute of Electrical and Electronics Engineers (IEEE). 802.11 systems provide LAN access for electronic devices without the need for wiring. However, 802.11 systems require the installation of costly and complex access points throughout a campus, which requires careful site surveys, network planning, deployment, and management. Security needs to be maintained throughout the whole system, including at each of the access points distributed across the campus, sometimes in an open environment. Therefore, managing an 802.11 system can be difficult and costly.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a method and system providing for distributed wireless access to a local area network are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
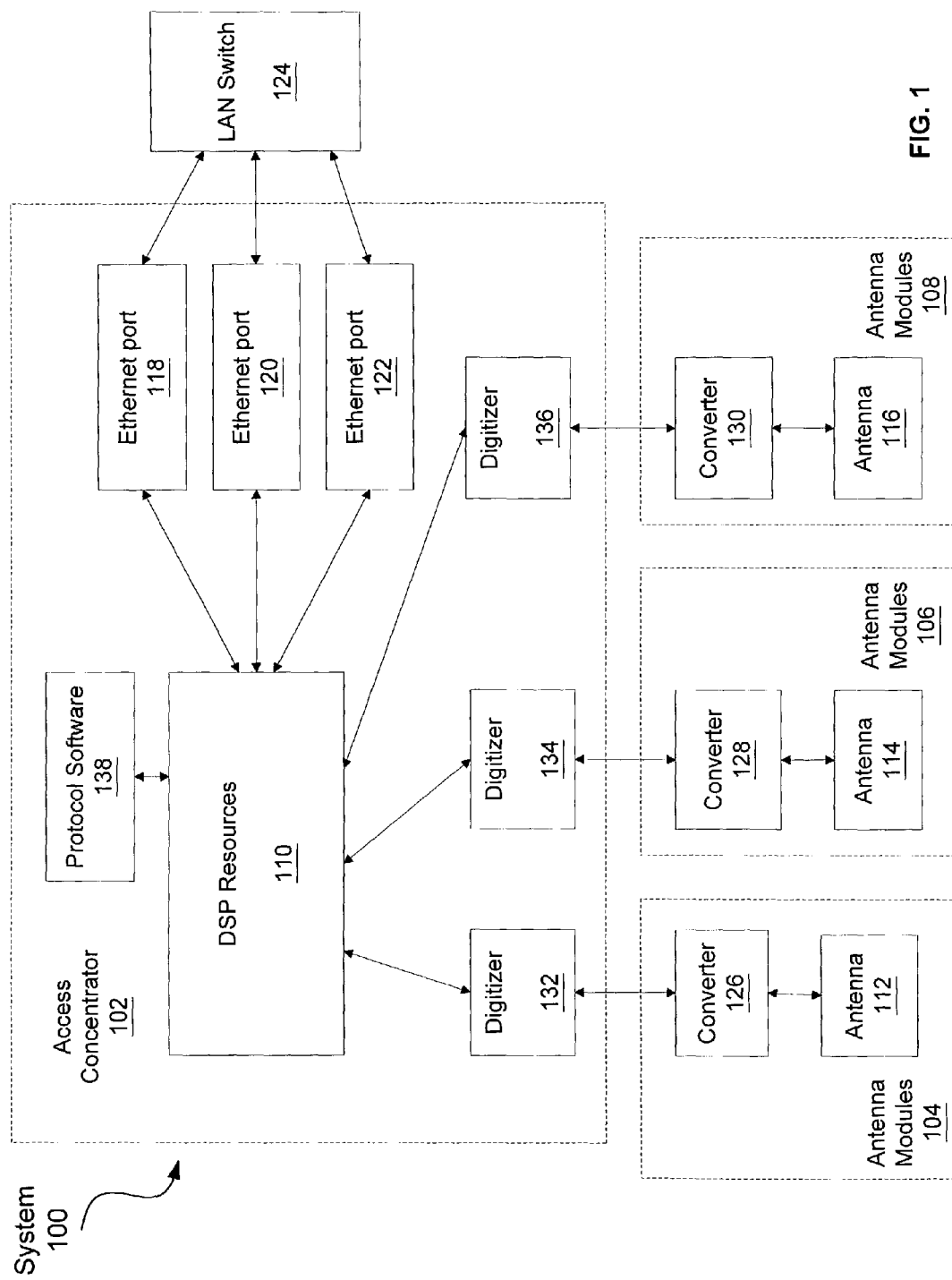
FIG. 1 illustrates is a block diagram illustrating a system incorporating one embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment of the invention.

System 100 includes an access concentrator 102 and a plurality of antenna modules. The access concentrator is physically separated from the antenna modules. This enables the antenna modules to be spread across a campus. The access concentrator is connected to the antenna modules via network wiring, such as Cat5 cable. A client may have a standard wireless interface, such as the Institute of Electrical and Electronics Engineers (IEEE) standard 802.11b, also known as Wi-Fi. The client may use this wireless interface on an electronic device, such as a laptop, desktop, or personal digital assistant (PDA), to connect to a local area network (LAN) via one of the antenna modules deployed throughout the campus. The antenna module may be plugged into a telephone jack, such as a RJ45 jack. The antenna module may be powered locally or powered over the cable from the jack.

The number of antenna modules in a system may vary. In the example shown, system 100 has three antenna modules 104, 106, and 108. Each antenna module includes an antenna, e.g. 112, 114, or 116, to receive and transmit radio frequency (RF) signals. Each antenna module also includes a converter, e.g. 126, 128, or 130, to down-convert incoming signals to a lower frequency and up-convert outgoing signals to a higher frequency. In one embodiment of the invention, the incoming RF signals are down-converted to a baseband frequency. In one embodiment, the incoming RF signals are down-converted to an intermediate frequency (IF). In one embodiment, the antenna module may be a frequency mixer that converts a RF signal to an IF or baseband signal using a local oscillator. The antenna module may also include a phase locked loop (PLL), an amplifier, and/or a global reference tone for reliable communication over the cable connecting the antenna module to the access concentrator.

After incoming RF signals are down-converted, they are sent to a digitizer, e.g. 132, 134, or 136, to digitize the signals. In one embodiment, the digitizer includes an analog-to-digital converter and a digital-to-analog converter. Incoming signals are digitized using the analog-to-digital converter, while the digital-to-analog converter is used to convert outgoing digital signals to analog signals. In one embodiment, as shown in FIG. 1, the digitizer is part of the access concentrator 102. In this case, the down-converted signals are transmitted to the access concentrator 102, where the signals are digitized and then processed by digital processing resources 110.

Figure 2:
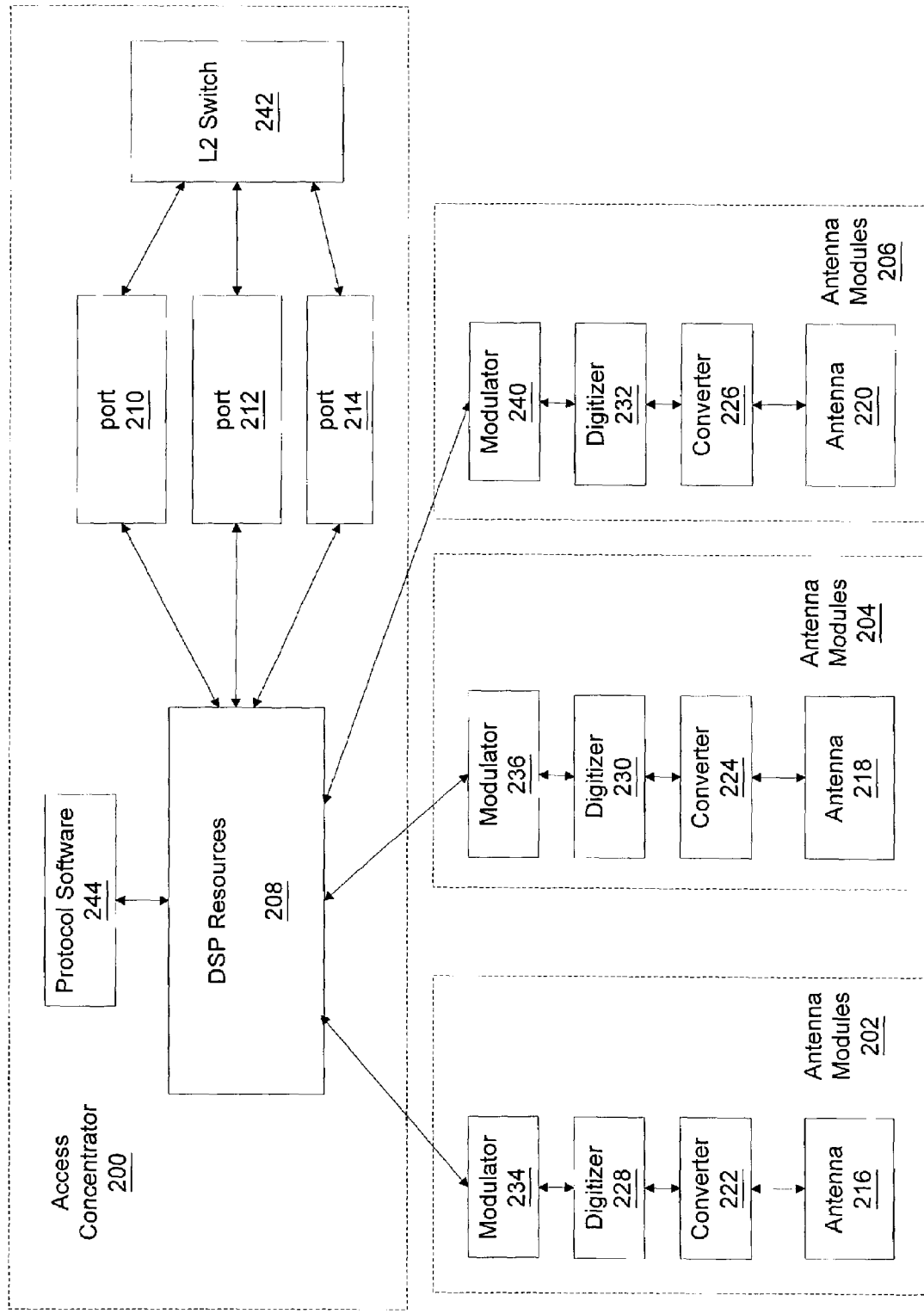
FIG. 2 illustrates is a block diagram illustrating a system incorporating an alternative embodiment of the invention.

In one embodiment of the invention, as shown in FIG. 2, the digitizer is part of the antenna module. In this case, each antenna module also includes a modulator, e.g. 234, 236, or 240, to modulate the digital signals before transferring the modulated signals from the antenna module, e.g. 202, 204, or 206, to the access concentrator 200. In one embodiment of the invention, an Ethernet modulation scheme is used to modulate the digital signals. In other embodiments, other standard modulation schemes, such as Multi-Level Transmit-3 Levels (MLT3), Non-Return to Zero (NRZ), or Binary Partial Response (BPR), may be used to modulate the digital signals. In one embodiment, the access concentrator includes a demodulator. The access concentrator receives the modulated digital signals from the antenna module and demodulates the signals.

The digital signals are processed at the access concentrator by digital signal processing resources, e.g. 110 or 208, and frames are extracted. Frames may be in various formats, such as those defined by the IEEE standards 802.11 or 802.3.

Other functions, such as receive and transmit functions, may be handled using the digital signal processing resources, protocol software (e.g. 138 or 244), or a general purpose microprocessor. After the processing is completed, the frames are forwarded out of the corresponding ports to a Local Area Network (LAN) switch. In one embodiment, the ports are Ethernet ports. In one embodiment, each port maps to one antenna module. In one embodiment, at least one of the ports maps to more than one antenna module.

In one embodiment, as shown in FIG. 1, the LAN switch 124 is external to the access concentrator 102. In this case, the LAN switch 124 is connected to the access concentrator 102 via network wiring, such as Cat5 cable. In one embodiment, as shown in FIG. 2, the LAN switch 242 is integrated with the access concentrator 200. In this case, the LAN switch 242 may be connected via traces on a circuit board.

Figure 3:
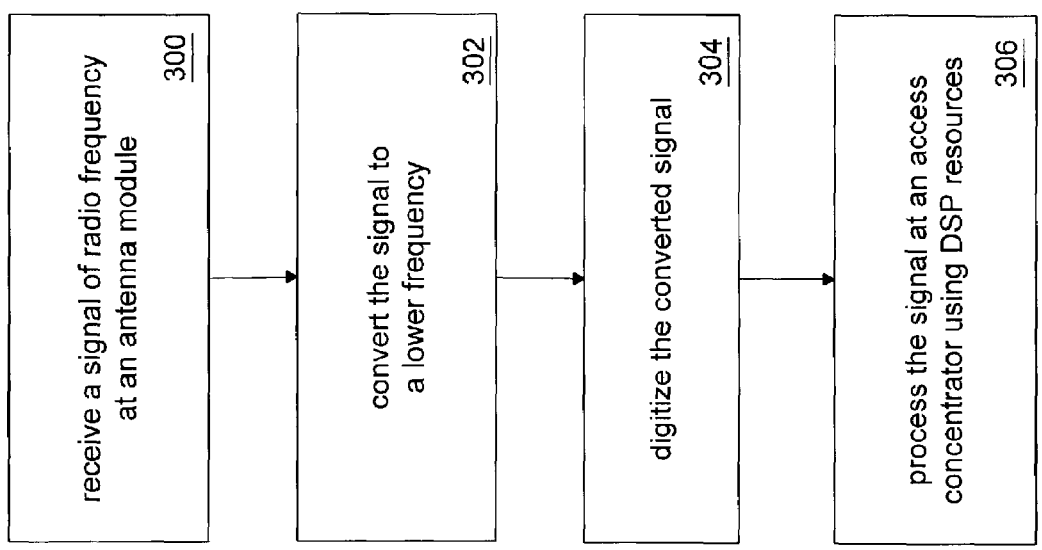
FIG. 3 is a flow diagram illustrating a method according to an embodiment of the invention.

FIG. 3 is a flow diagram illustrating a method according to an embodiment of the invention. At 300, a RF signal is received at an antenna module. At 302, the RF signal is converted to a lower frequency. The RF signal may be converted to a baseband frequency or an intermediate frequency. In one embodiment, the converted signal is transmitted to the access concentrator. At 304, the converted signal is digitized. In one embodiment, the converted signal is digitized by an analog-to-digital converter in the access concentrator. In one embodiment, the converted signal is digitized by an analog-to-digital converter in the antenna module. In latter case, the digital signal is then modulated at the antenna module. Then, the modulated digital signal is transmitted to the access concentrator, where the signal is demodulated. At 306, the digital signal is processed at the access concentrator using digital signal processing resources. In one embodiment, the digital signal is packetized using the digital signal processing resources. In one embodiment, the digital signal is packetized according to an Ethernet protocol. The signal is then forwarded out of a port of the access concentrator to a LAN switch.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

receiving a radio frequency signal at an antenna module for a wireless local area network (LAN) coupled to a registered jack;

converting the signal to a lower frequency;

transmitting the converted signal from the antenna module to an access concentrator coupled to the registered jack via a cable;

digitizing the converted signal at the access concentrator; and processing the digital signal at the access concentrator using one or more digital signal processing resources, where processing includes extracting frames of data of various wireless formats and sending the frames out communication ports to a LAN switch connected to the communication ports.

2. The method of claim 1, wherein converting the signal to a lower frequency comprises converting the signal to a baseband frequency at the antenna module.

3. The method of claim 1, wherein processing the digital signal at the access concentrator comprises packetizing the digital signal using the digital signal processing resources.

4. The method of claim 3, wherein packetizing the digital signal comprises packetizing the digital signal according to an Ethernet protocol.

5. A method comprising:

receiving a radio frequency signal at an antenna module for a wireless local area network (LAN) coupled to a registered jack;

converting the signal to a lower frequency;

digitizing the converted signal;

modulating the digital signal;

transmitting the modulated digital signal from the antenna module to an access concentrator coupled to the registered jack via a cable;

demodulating the modulated digital signal at the access concentrator; and processing the demodulated digital signal at the access concentrator using one or more digital processing resources, where processing includes extracting frames of data of various wireless formats and sending the frames out communication ports to a LAN switch connected to the communication ports.

6. The method of claim 5, wherein processing the digital signal at the access concentrator comprises packetizing the digital signal using the digital signal processing resources.

7. The method of claim 6, wherein packetizing the digital signal comprises packetizing the digital signal according to an Ethernet protocol.

8. A campus network comprising:

a plurality of registered jacks at distributed locations across a campus;

a plurality of antenna modules, coupled to the registered jacks, to receive and transmit radio frequency signals associated with wireless local area networks (LANs); and an access concentrator coupled to the registered jacks via network wiring to process the signals received from the antenna modules using protocol software and a plurality of digital signal processing resources, including extracting frames of data of various wireless formats and sending the frames out communication ports to a LAN switch connected to the communication ports;

wherein each antenna module further comprises:

a phased lock loop;

an amplifier; and a global reference tone for reliable communication over the network wiring and the registered jack connecting the antenna module to the access concentrator.

9. The campus network of claim 8, wherein each antenna module comprises a converter to convert the radio frequency signals to a lower frequency.

10. The campus network of claim 9, wherein each antenna module comprises a digitizer to digitize the converted signals.

11. The campus network of claim 10, wherein each antenna module comprises a modulator to modulate the digital signals before transmitting the signals to the access concentrator.

12. The campus network of claim 11, wherein the access concentrator further comprises a demodulator to demodulate the modulated signals received from the antenna modules.

13. The campus network of claim 9, wherein each antenna module to further transmit the converted signals to the access concentrator.

14. The campus network of claim 13, wherein the access concentrator comprises a digitizer to digitize the converted signals before processing the signals using the digital signal processing resources.

15. The campus network of claim 14, wherein the access concentrator to further packetize the digital signals.

16. The campus network of claim 15, wherein the access concentrator comprises the LAN switch to transmit the packetized signals.

17. An antenna module comprising:

an antenna to receive and transmit radio frequency (RF) signals associated with a wireless local area network (LAN);

a converter to down-convert incoming RF signals to a lower frequency and up-convert outgoing signals to a higher frequency;

a registered jack interface to couple the antenna module into a registered jack and to transmit/receive signals to/from an access concentrator that processes received signals including extracting frames of data of various wireless formats and sending the frames out communication ports to a LAN switch connected to the communication ports; and a phased lock loop, an amplifier, and a global reference tone to ensure reliable communication over the registered jack interface.

18. The antenna module in claim 17 further comprising a digitizer to digitize the incoming and outgoing signals.

19. The antenna module in claim 18 further comprising a modulator to modulate the incoming signals from the digitizer and the outgoing signals received from the access concentrator via the registered jack interface.

* * * * *